United States Patent [19]
Mueller

[11] 3,719,948
[45] March 6, 1973

[54] INCREASED FIELD OF VIEW OF DETECTOR ARRAY

[75] Inventor: Rolf K. Mueller, Brighton, Mich.

[73] Assignee: The Bendix Corporation, Southfield, Mich.

[22] Filed: Oct. 8, 1970

[21] Appl. No.: 79,156

[52] U.S. Cl....343/113 R, 343/100 LE, 343/113 DE, 343/118, 343/757
[51] Int. Cl..................................................G01s 3/06
[58] Field of Search .......343/118, 113, 113 DE, 757, 343/100 LE

[56] References Cited

UNITED STATES PATENTS 3,412,405 11/1968 Crotty et al..............343/100 LE UX
2,861,264 11/1958 Lair.................................343/113 R

*Primary Examiner*—Benjamin A. Borchelt
*Assistant Examiner*—Richard E. Berger
*Attorney*—Lester L. Hallacher and Plante, Hartz, Smith and Thompson

[57] ABSTRACT

A system for increasing the field of view of an array of detectors is described. The system also unambiguously positions the target with respect to the normal to the array. These advantages are obtained by periodically linearly moving, or vibrating, the array along an axis within the plane of the array. The frequency of vibration is constant and is selected for convenient detection and measurement. The amplitude of vibration is related to the spacing of the detectors within the array so that expanding the equation describing the field of view of a single detector as a Taylor series along the axis of vibration yields an expression containing frequency components which are readily detected and separated to thereby effectively double the density of detectors within the array.

10 Claims, 4 Drawing Figures

3,719,948

INCREASED FIELD OF VIEW OF DETECTOR ARRAY

BACKGROUND OF THE INVENTION

Arrays of radiation sensitive detectors are used for a variety of applications. Ordinarily the detectors are sensitive to electromagnetic radiation such as infrared, visible light or microwaves. The individual detectors within the array are systematically arranged in a pattern so that an uniform spacing exists between the detectors.

The field of view of the array is dependent upon spacing between the detector elements within the array and also upon the wavelength of the detected radiation. Thus, with a spacing of $\gamma$ between detectors and a radiation wavelength of $\lambda$, the angular field of view $\rho$ is defined as $\rho = 2\arcsin(\lambda/2\gamma)$. Because the angular field of view is dependent upon the spacing $\gamma$, an increase in the field of view of a given wavelength of radiation can be obtained only by decreasing the spacing $\gamma$. This requires an increase in a number of detectors within the array and therefore is subject to economic considerations.

An operational difficulty of such arrays stems from the inability to uniquely interpret the location of the target within the detected radiation pattern. A target which is located at an angle of $\lambda/\gamma$ from the normal to the array can be misinterpreted as being positioned at a zero degree angle, that is along the normal to the array.

CROSS REFERENCE TO RELATED APPLICATIONS

Application Ser. No. 117,535, filed Feb. 22, 1971, by Emanuel Marom entitled "Increased Field of View Detector Array" and assigned to the assignee of the instant application, discloses a system for angularly vibrating a detector array to increase the field of view in a plane normal to the plane of increase of this application.

SUMMARY OF THE INVENTION

The inventive system effectively doubes the angular field of view of a planar detector array and also yields an output which unambiguously locates the positioning of the target within the field of view of the array. These improvements are achieved by periodically moving, as by a vibrating motion, the detector array along an axis of the plane which is coincident with the plane containing the array. The peak amplitude of oscillation of the array is made equal to one half of the separation of the detector elements within the array and oscillation occurs at a constant frequency which is convenient and readily detected.

Because the spacing of the detectors and the amplitude of vibration are equal the equation describing the radiation pattern at a particular detector contains a common term. The equation can therefore be expanded in a Taylor series along the axis of vibration. The Taylor expansion contains terms which have different frequencies and therefore the terms can readily be separated by standard frequency separation techniques. By properly combining the separate frequency components additional detectors can be simulated and the field of view of the array increased. The increase occurs only in the plane in which the array vibrates.

DETAILED DESCRIPTION

Figure 1:
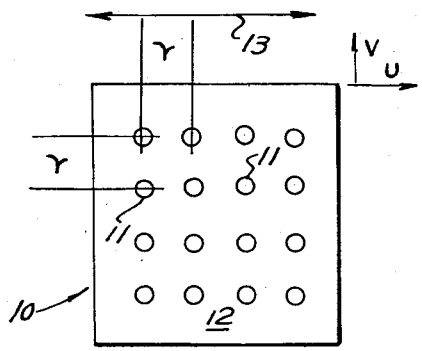
FIG. 1 illustrates an array of detectors useful with the inventive concept.

As shown in FIG. 1, the array of detectors 10 includes a planar surface 12 upon which is mounted a plurality of detector elements 11. The detector elements 11 are spaced by a distance of $\gamma$ along the horizontal axis $u$, and by an equal spacing $\gamma$ along the vertical axis $v$. As indicated by the arrow 13, the entire array of detectors is vibrated back and forth in a direction parallel to the axis $u$. The peak amplitude of vibration is made equal to $\gamma/2$.

The individual detectors 11 are point detectors of a type well known in the art. These detectors can be sensitive to visible light, invisible light, other forms of electromagnetic energy, or any type of energy which is to be detected. The field of view, that is the detection pattern of the detector array, corresponds to the main lobe 14 of the pattern shown in FIG. 2 and is equal to $2\arcsin(\lambda/2\gamma)$. This defines the field of view of the prior art device, and as explained hereinafter is greatly increased by the invention.

Figure 2:
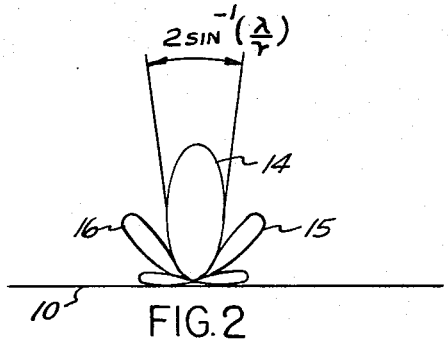
FIG. 2 shows the detection pattern of the detector array of FIG. 1.

The detection pattern shown in FIG. 2 includes a main lobe 14 and an upper side lobe 15 and a lower side lobe 16. This detection pattern is perpendicular to the detector array 10 as illustrated in the figure. With the prior art devices a target present on the main lobe 14 can be accurately located as being on that lobe. However, a target present on either of the side lobes 15 and 16 cannot be unambiguously located. For this reason, the effective field of view of the prior art systems is confined to the width of the main lobe 14.

The present invention overcomes this disadvantage by vibrating the detector array along the u axis at a constant frequency $f_s$. The vibration has an amplitude $\Delta$, and as will be more fully explained hereinafter, the value of $\Delta$ is chosen to be equal to $\Delta/2$.

As was explained above, the field of view of the entire detector array is equal to $2\arcsin(\lambda/2\gamma)$. However, the field detected at a given location is given by $$I(u_m, v_n) \exp i \, \rho(u_m, v_n) \qquad (1)$$

where:
$I$ = the intensity of radiation received
$\rho$ = phase angle
Upon the periodic vibration of the detector array, each point detector essentially provides the field oh view:

$$I(u_m, v_n)_e \, i[\rho(u_m + \Delta \cos\omega_s t, v_n) + \omega_o t] \qquad (2)$$

Equation (2) is based on the assumption that $I(u_m + \Delta\cos\omega Bst, v_n) = I(u_m, v_n)$. Expansion of expression (2) as a function of position, that is a Taylor series along the $u$-axis yields:

$I(u_m, v_n) \exp(i[\rho(u_m,v_n)+\omega_o t]) + iI(u_m,v_n)\Delta \cos\omega_s t$
$\exp(i[\rho\pi(u_m,v_n)+\omega_o t])2\rho/2u = I \exp(i(\omega_o t+\rho)) + i($ $$(1/2)\exp(i[p+(\omega_o+\omega_s)t])\Delta(2p/2u) + i(1/2)\exp(i[p+(\omega_o-\omega_s)t])\Delta(2p/2u)$$

(3)

The separation between the terms of the expression (3) is readily done because each of the terms has a different frequency, and therefore, the separation can be done electronically. It is, therefore, quite simple to synthesize an array which is twice as dense in the plane of vibration as the original array simply by allowing $\Delta$ to equal $\gamma/2$.

Figure 3:
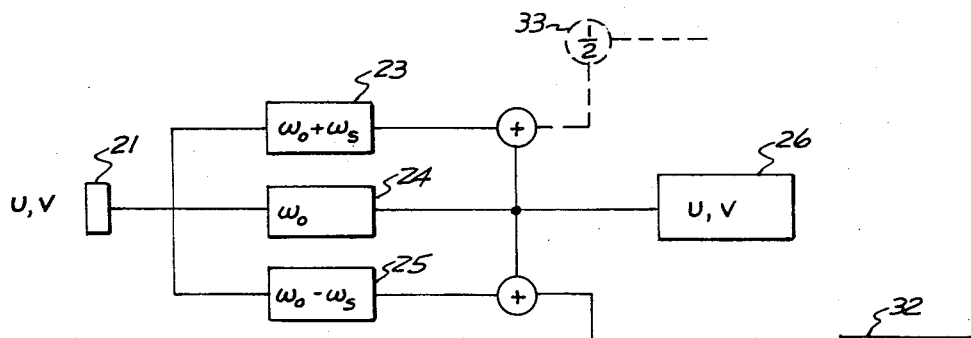
FIG. 3 is a preferred embodiment of the invention.

A simplified schematic diagram of the system for processing the output from the detectors is shown in FIG. 3. Two detectors 21 and 22, which are identical to the detectors 11 shown in the FIG. 1 array, and which are adjacent detectors, and therefore, which are spaced by the physical distance $\gamma$, are shown in FIG. 3. Each of the detectors has an output which contains the three frequency components shown in the Taylor expansion expressed as equation (3) hereinabove. Accordingly, the output of detector 21 iS directed to three filters 23, 24, and 25. Filter 23 is designed to have a bandpass which is equal to $\omega_o+\omega_s$, filter 24 has a $\omega_o$ bandpass and filter 25 has a bandpass $\omega_o-\omega_s$. The combined outputs of these three filters yields an indication at summing device 26 which is representative of the detection pattern at the $u,v$ detector.

Detector 22 is represented as being positioned at the $(u+2\Delta,v)$ position of the detector array. Accordingly, this detector is immediately adjacent to the detector 21 and is spaced from it by a distance $\gamma$.

The output detected at the position which is midway between two adjacent detectors, which position is defined as the $(u+\Delta, v)$ position, is the average of the two outputs present at the locations of the two detectors 21 and 22. Accordingly, this output is derived by averaging the outputs from the adjacent detectors, this is indicated by the averaging device 31 of FIG. 3. An additional simulated output is obtained by combining the output of the $(u+2\Delta,v)$ detectOr 22 with the output of the next adjacent detector. The adjacent detectors would be located at $(u+4\Delta,v)$ position of the detector array. This combination of outputs would take place in averaging circuit 34. In like manner, the output of the $(u,v)$ detector 21 would also be coMbined with any preceding detector output in averaging circuit 33 to produce another simulated detector output.

The density of the detector array in the plane of vibration is effectively doubled by vibrating the array at an amplitude which is equal to $\gamma/2$ or one-half the detector spacing. Variations of the concept are readily attainable. For example, by having a vibration amplitude equal $\gamma/3$, i.e., one third the detector spacing, an effective array density of three times the density of the original array is obtained.

Also more complex processing can be used to obtain higher deriva-tives and thereby evaluate more points.

Figure 4:
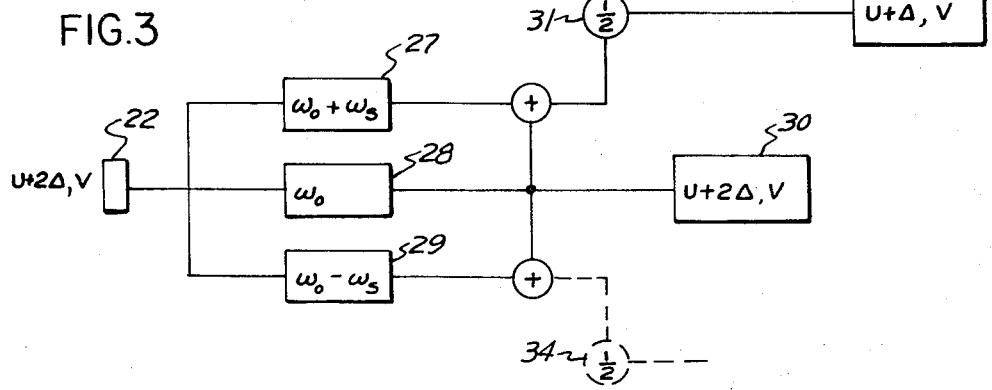
FIG. 4 is a simplified circuit diagram of a system useful with the invention.
Figure 4:
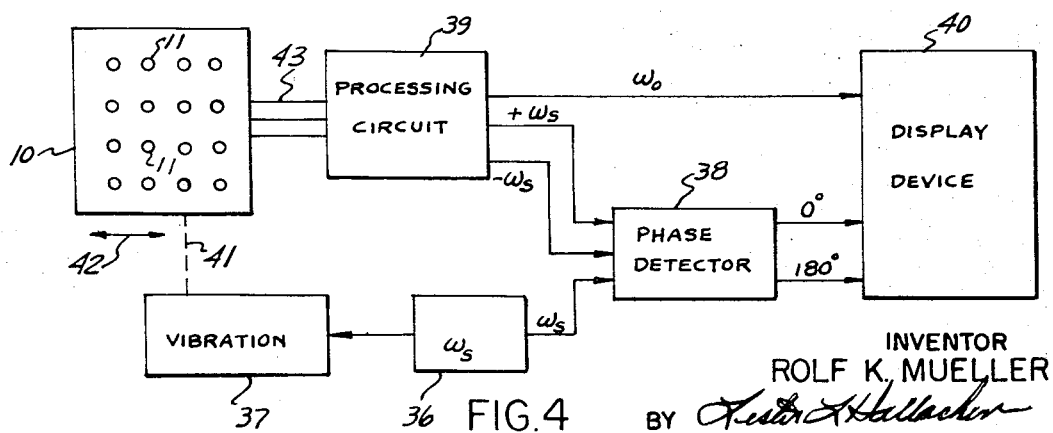

FIG. 4 shows a preferred embodiment of a circuit useful with the inventive concept. A frequency generator 36 produces a constant frequency output having a frequency of $\omega_s$. A vibration unit 37 is actuated by the output of the frequency generator 36, and therefore, vibrates at a frequency of $\omega_s$. This vibration motion is coupled to the detector array 10 by way of a mechanical coupling 41 so that the array vibrates along the $u$-axis as indicated by the arrow 42.

The outputs from the detectors 11 within the detector array 10 are coupled by means of the coupling lines 43 to a processing circuit 39. Processing circuit 39 contains the filtering system shown in FIG. 3, and therefore, the three outputs in summing circuits 26, 30, and 32 are obtained. Also the three frequencies $\omega_o$, $\omega_s$, and $-\omega_s$ can be separated in the processing circuit 39. The frequency separation is useful in determining the location of a target within the radiation pattern shown in FIG. 2. A target present within the main lobe 14 will cause an increase in the intensity of the main lobe, this is indicated by the $\omega_o$ output. Alternatively, a target present within one of the side lobes 15 or 16 will cause a fluctuation of the $\pm\omega_o$'s outputs to fluctuate in accordance with the vibration frequency of the array. This is the $\omega_s$ frequency generated by the generator 36. By comparing the phase of the fluctuating $\omega_s$ output to the phase of the oscillator 36 frequency, it is possible to determine whether the target is present on the upper side lobe 15 or the lower side lobe 16.

The signals indicative of the intensity fluctuations caused by the pResent of the target within the radiation pattern serve as inputs to a display device 40 from which the information is read and utilized in a manner consistent with the intended operational features of the system. Accordingly, the display device can be a visual display device such as a cathode ray tube or alternatively the display device can include a pen and paper to draw a diagram of the outputs in a known manner

What is claimed is:

1. A system for effectively increasing the field of view of an array of detectors comprising:
   an array of detector elements systematically arranged and uniformly spaced in a detection plane;
   means for periodically moving said array along an axis of movement within said detection plane and through a constant amplitude relative to said uniform spacing of said detector elements;
   and utilization means receiving the outputs of said detector elements and yielding an output indicative of an array wherein the spacing between the successive detector elements is less than the physical spacing between successive elements in said array along the axes of movement.

2. The system of claim 1 wherein said detector elements are arranged along orthogonal axes and said axis of movement is parallel to one of said orthogonal axes; and said detector elements are spaced at a distance of $\gamma$ in the directions of said orthogonal axes.

3. The system of claim 2 wherein the periodic movement of said array occurs at a constant frequency and said constant amplitude is equal to $\gamma/2$.

4. The system of claim 1 wherein said detectors are responsive to radiation having a frequency $\omega_o$ and said periodic movement occurs at a frequency $\omega_s$.

5. The system of claim 4 wherein said utilization means includes a plurality of filters which are individually responsive to a frequency of $\omega_o+\omega_s$, $\omega_o-\omega_s$ and $\omega_o$; and
   further including means for averaging said $\omega_o+\omega_s$ frequency and said $\omega_o-\omega_s$ frequency to give an output indicative of a position located between two successive detector elements within said array.

6. The system of claim 5 wherein said utilization means further includes;
   comparing means for comparing the phase of the detector outputs with the phase of the periodic movement $\omega_s$; and
   visual display means for displaying the outputs of said detector elements to thereby give an unambiguous location of a target within the main, the upper or the lower side lobes the pattern of said array.

7. The system of claim 5 wherein said detector elements are arranged along orthogonal axes and said axes of movement is parallel to one of said orthogonal axes; and said detector elements are spaced at a distance of $\gamma$ in the directions of said orthogonal axes.

8. The system of claim 7 wherein the periodic movement of said array occurs at a constant frequency of $\omega_s$ and said constant amplitude is equal to $\gamma/2$.

9. The system of claim 8 wherein said utilization means further includes means for generating said frequency $\omega_s$; means for vibrating said array at said $\omega_s$ frequency; and means for separating and comparing the phase of said $+\omega_s$ frequency and said $-\omega_s$ frequency with said $\omega_s$ frequency from said means for generating to determine which of said side lobes said target is positioned on.

10. The system of claim 3 wherein said axis of movement lies along an axis within said array so that the field of view of said array is doubled in the plane containing said axis of movement.

* * * * *